(12) United States Patent
Froeschle et al.

(10) Patent No.: US 7,438,347 B2
(45) Date of Patent: Oct. 21, 2008

(54) AIR GUIDING SYSTEM FOR A VEHICLE

(75) Inventors: Mathias Froeschle, Ostfildern (DE); Markus Schulzki, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,626

(22) Filed: Mar. 27, 2007

(65) Prior Publication Data

US 2007/0236046 A1 Oct. 11, 2007

(30) Foreign Application Priority Data

Mar. 28, 2006 (DE) .................. 10 2006 014 260

(51) Int. Cl.
*B62D 37/02* (2006.01)

(52) U.S. Cl. ................. 296/180.5; 180/903; 296/26.12; 296/180.1

(58) Field of Classification Search .................. 105/1.3; 180/903; 244/213; 296/26.01, 26.12, 26.13, 296/180.1, 180.2, 180.3, 180.4, 180.5

See application file for complete search history.

(56) References Cited

U.S. PATENT DOCUMENTS

| | | | | |
|---|---|---|---|---|
| 1,274,986 A | * | 8/1918 | Carolin | 244/213 |
| 1,762,002 A | * | 6/1930 | De Putte | 244/213 |
| 3,791,468 A | * | 2/1974 | Bryan, Jr. | 180/69.2 |
| 4,773,692 A | * | 9/1988 | Schleicher et al. | 296/180.5 |
| 4,925,236 A | * | 5/1990 | Itoh et al. | 296/180.5 |
| 5,013,081 A | * | 5/1991 | Cronce et al. | 296/180.1 |
| 5,120,105 A | * | 6/1992 | Brin et al. | 296/180.5 |
| 5,536,062 A | * | 7/1996 | Spears | 296/180.3 |
| 6,382,708 B1 | * | 5/2002 | Erdelitsch et al. | 296/180.5 |
| 6,672,651 B1 | * | 1/2004 | Shuen | 296/180.5 |
| 7,322,638 B2 | * | 1/2008 | Larson et al. | 296/180.5 |
| 2002/0074826 A1 | * | 6/2002 | Presley | 296/180.1 |
| 2007/0001482 A1 | | 1/2007 | Larson | |

FOREIGN PATENT DOCUMENTS

| | | |
|---|---|---|
| DE | 30 19 150 A1 | 11/1981 |
| DE | 43 05 090 A1 | 8/1994 |
| DE | 10 2004 030 571 A1 | 1/2006 |
| DE | 10 2005 030 203 A1 | 1/2007 |

(Continued)

OTHER PUBLICATIONS

German Office Action dated Dec. 5, 2006 with English translation (Six (6) pages).

(Continued)

*Primary Examiner*—D. Glenn Dayoan
*Assistant Examiner*—Paul A Chenevert
(74) *Attorney, Agent, or Firm*—Crowell & Moring LLP (57) ABSTRACT

An air guiding system for a vehicle, particularly for a passenger car, is arranged in a rear area of the vehicle and has a main air guiding element that can be displaced from a moved-in inoperative position into a moved-out operative position. Viewed in the longitudinal direction of the vehicle, the main air guiding element, while forming at least two main air guiding element sections, is divided such that, when the main air guiding element is displaced from the inoperative position into the operative position, at least lateral main air guiding element sections can be moved transversely to the longitudinal direction of the vehicle.

17 Claims, 9 Drawing Sheets

FOREIGN PATENT DOCUMENTS

| | | | | | |
|---|---|---|---|---|---|
| EP | 271757 | A2 * | 6/1988 | ................ | 244/46 |
| EP | 1 73 996 | A2 | 1/2007 | | |
| JP | 60163773 | A * | 8/1985 | ............. | 296/180.5 |
| JP | 03000578 | A * | 1/1991 | ............. | 296/180.1 |
| JP | 03281484 | A * | 12/1991 | ............. | 296/180.1 |

OTHER PUBLICATIONS

European Search Report dated Apr. 27, 2007 including English translation of pertinent portion (Six (6) pages).

\* cited by examiner

AIR GUIDING SYSTEM FOR A VEHICLE

CROSS REFERENCE TO RELATED APPLICATIONS

This application claims the benefit of priority under 35 U.S.C. § 119 to German Patent Application No. 10 2006 014 260 filed Mar. 28, 2006, the disclosure of which is incorporated herein by reference in its entirety.

This application is related to application Ser. No. 11/727,610, filed Mar. 27, 2007; application Ser. No. 11/727,611, filed Mar. 27, 2007; application Ser. No. 11/691,950, filed Mar. 27, 2007; application Ser. No. 11/727,615, filed Mar. 27, 2007; and application Ser. No. 11/727,625, filed Mar. 27, 2007.

BACKGROUND AND SUMMARY OF THE INVENTION

The present invention relates to a vehicle air guiding system, particularly for a passenger car, which is arranged in a rear area of the vehicle and comprises a main air guiding element which can be displaced from a moved-in inoperative position into a moved-out operative position DE 30 19 150 A1, shows a vehicle air guiding system arranged in an upper rear area of the vehicle and having an air guiding element that can be displaced from an inoperative position, in which it is integrated in the shaping of the rear area flush with the surface, into a moved-out operative position. The air guiding element is configured as an aerofoil which, by way of an operating device, can be displaced or changed between the inoperative position and the operative position.

DE 43 05 090 A1 also discloses a vehicle air guiding system arranged in a rear area of the vehicle and having an air guiding element that can be displaced from an inoperative position into a moved-out operative position. The air guiding element is formed by a rear spoiler arranged in a recessed receiving device of the vehicle body and can be displaced by an operating device between the inoperative position and the operative position.

The air guiding systems known from DE 30 19 150 A1 and DE 43 05 090 A1, increase the rear axle output coefficient ($c_{ah}$-value) of the motor vehicle while maintaining the drag coefficient ($c_w$-value) at the same level or improving the same. Each of these known air guiding elements has the same transverse dimension in the inoperative position and in the operative position.

German Patent Document DE 10 2005 030 203, discloses a vehicle air guiding system having a central main air guiding element as well as two lateral auxiliary air guiding elements. The auxiliary air guiding elements allow the transverse dimension of the air guiding system to be enlarged in the operative position. The effective aerodynamic flow face area of the air guiding system can thereby be enlarged in the operative position, whereby particularly the rear axle output coefficient can be further increased. The adjusting movement of the disclosed lateral auxiliary air guiding elements takes place when the central main air guiding element has been displaced from the inoperative position into the operative position.

An object of the present invention is to provide a novel vehicle air guiding system in which, viewed in the vehicle longitudinal direction, the main air guiding element is divided while forming at least two main air guiding element sections. Thereby, during the displacement of the main air guiding element from the inoperative position into the operative position, at least lateral main air guiding element sections can be displaced transversely to the longitudinal direction of the vehicle. In the air guiding system according to the invention, the transverse dimension of that system can be adapted within a very short time and in a very simple manner.

Preferably, during the displacement from the inoperative position, in which it is integrated in a shaping of the rear area of the vehicle, the main air guiding element can be swiveled into the operative position out of the shaping of the rear area, simultaneously or isochronously thereto. At least the lateral main air guiding element sections are movable transversely to the vehicle longitudinal direction while enlarging the transverse dimension of the air guiding system.

According to a first advantageous further development of the invention, a gap that forms during the transverse movement of adjacent main air guiding element sections can be closed by an auxiliary air guiding element that is integrated in one of the adjacent main air guiding element sections. A particularly simple construction of the air guiding system according to the invention can thereby be implemented.

According to a second alternative advantageous further development of the invention, a gap that forms during the transverse movement of adjacent main air guiding element sections can be closed by an auxiliary air guiding element that has a flap-type construction and is articulatingly connected with one of the adjacent main air guiding element sections. Thereby, a swiveling motion of the flap-type auxiliary air guiding element about a swiveling axis extending in the longitudinal direction of the vehicle is coupled to the traversing movement of the main air guiding element sections transversely to the longitudinal direction of the vehicle and thereby to the displacement of the main air guiding element from the inoperative position into the operative position. As a result, the forming gap can be closed flush with the surface.

According to a third alternative advantageous further development of the invention, a gap that forms during the transverse movement of adjacent main air guiding element sections can be closed by an auxiliary air guiding element having a flap-type construction and being articulatingly connected with both of the adjacent main air guiding element sections. As a result, a swiveling motion of the flap-type auxiliary air guiding element about a swiveling axis extending transversely to the longitudinal direction of the vehicle is coupled to the traversing movement of the main air guiding element sections transversely to the longitudinal direction of the vehicle and thus to the displacement of the main air guiding element from the inoperative position into the operative position. The thereby forming gap can also be closed flush with the surface.

Other objects, advantages and novel features of the present invention will become apparent from the following detailed description of the invention when considered in conjunction with the accompanying drawings.

DETAILED DESCRIPTION OF THE DRAWINGS

FIGS. 1 to 6 are different views of a vehicle body rear area 10 having a rear window 11 surrounded by a vehicle body part 12 in the front, the rear as well as on the sides. An air guiding system 13 is positioned in a rearward area of the vehicle body part 12 of the rear area 10 configured as a fastback and therefore below the rear window 11, according to a first embodiment of the invention.

Figure 1:
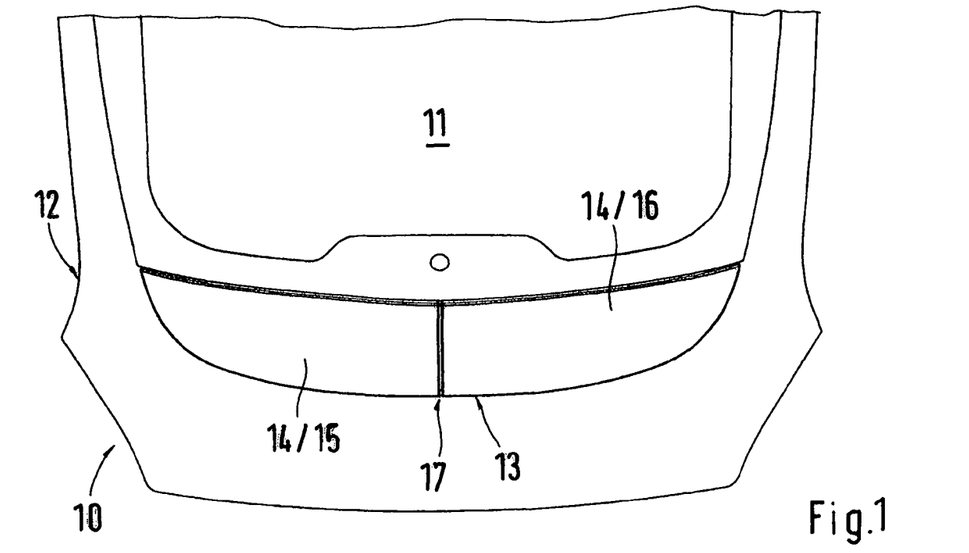
FIG. 1 is a plan view of a rear area of a vehicle with an air guiding system according to the invention according to a first embodiment of the invention in the inoperative position.
Figure 2:
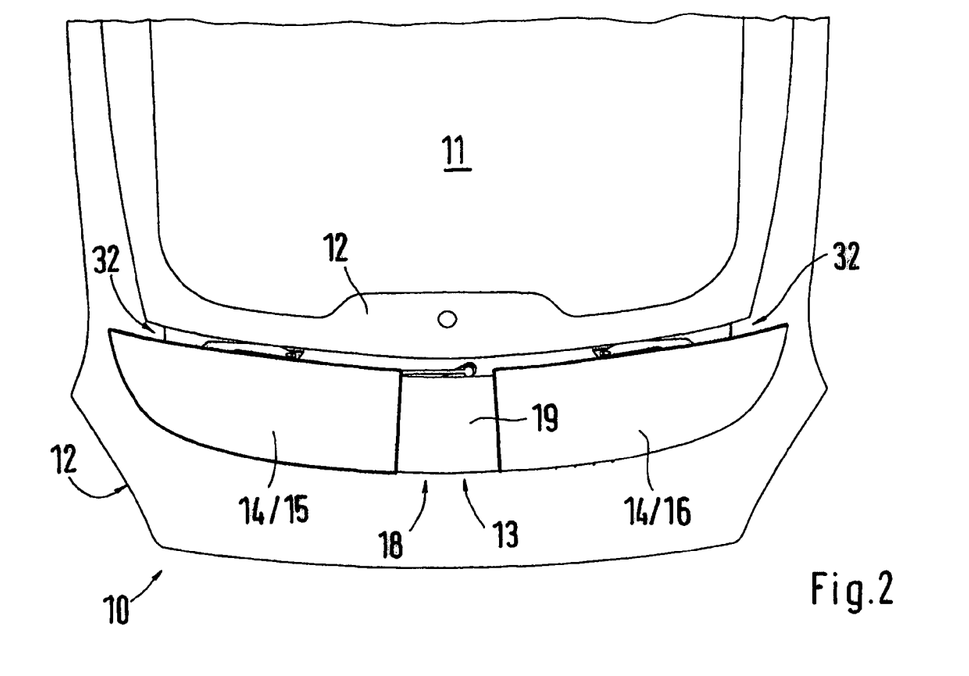
FIG. 2 is a view analogous to FIG. 1 but with the air guiding system in the operative position.
Figure 3:
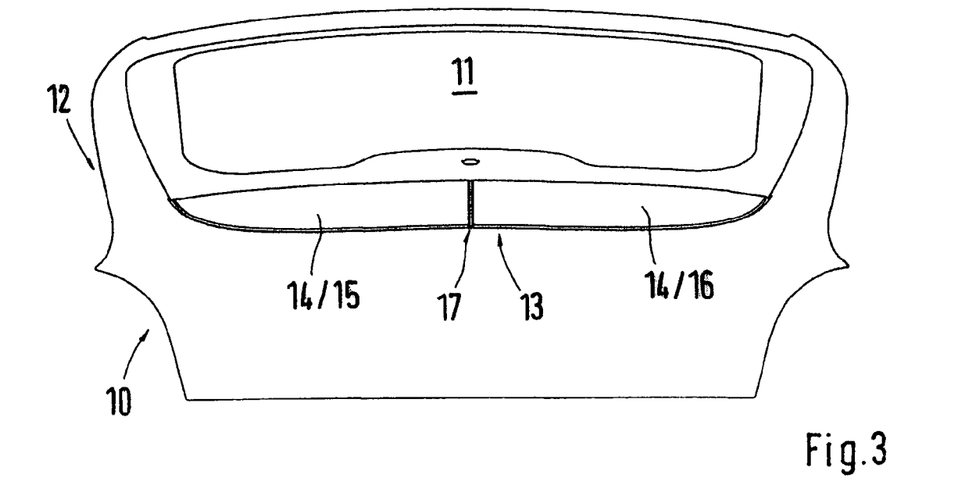
FIG. 3 is a rear view of the rear area of FIGS. 1 and 2 with the air guiding system in the inoperative position.
Figure 4:
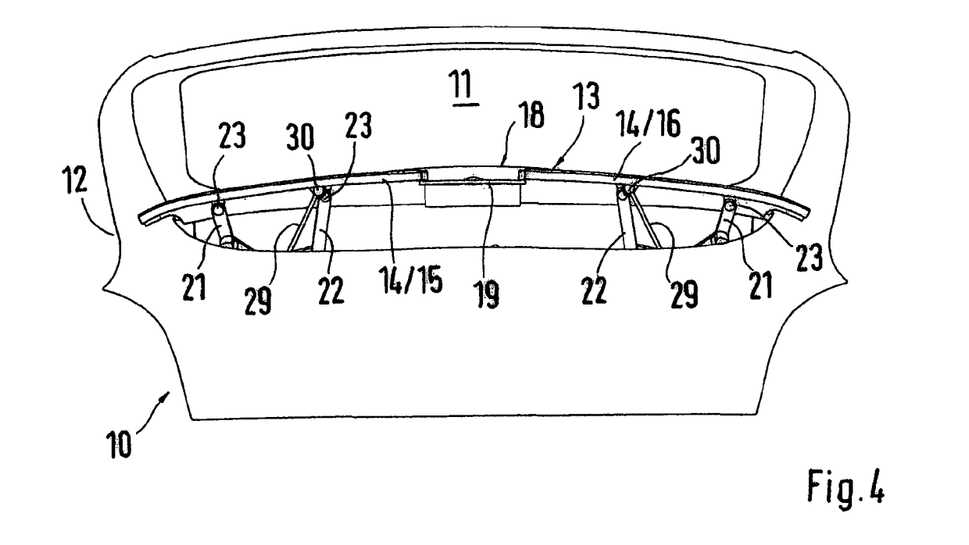
FIG. 4 is a view analogous to FIG. 3 but with the air guiding system in the operative position.
Figure 5:
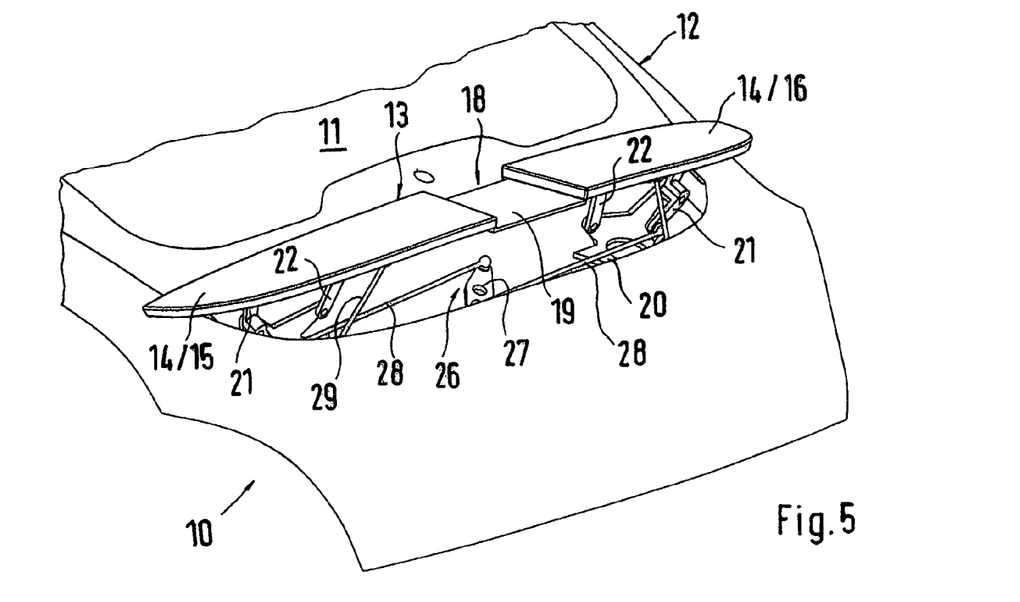
FIG. 5 is a perspective view diagonally from the rear of the rear area of FIGS. 1 to 4 with the air guiding system in the operative position.

FIGS. 1 and 3 show the air guiding system 13 in an inoperative position, and FIGS. 2, 4, 5 and 6 show the air guiding system 13 in an operative position.

In the inoperative position (FIGS. 1, 3), the air guiding system 13 is integrated flush with the surface in the rear area 10 of the vehicle. In contrast, in the operative position (FIGS. 2, 4, 5, 6), the air guiding system 13 is moved out of the surface contour of the rear area 10.

Figure 7:
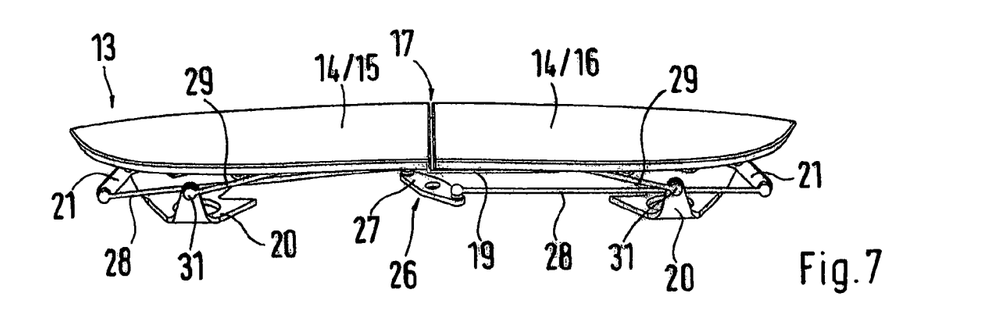
FIG. 7 is a view of the air guiding system of FIGS. 1 to 6, but in the inoperative position.
Figure 8:
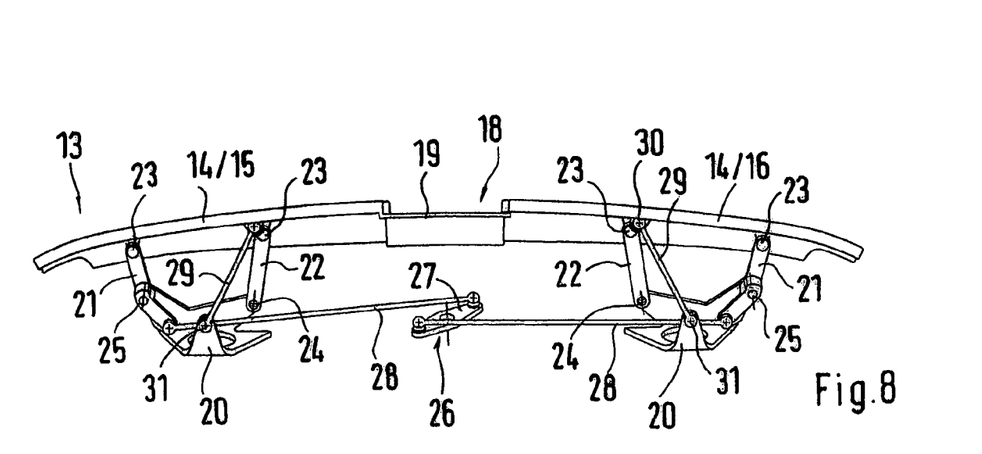
FIG. 8 is a view of the air guiding system of FIG. 7 in the operative position.
Figure 9:
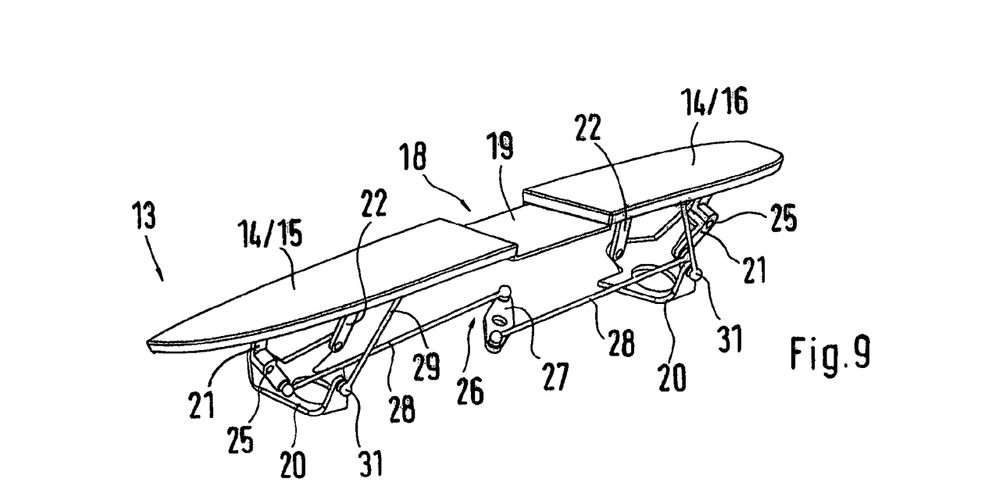
FIG. 9 is a view of the air guiding system of FIG. 7 in the operative position.

In FIGS. 7 to 9, the air guiding system 13 is shown alone, specifically according to FIG. 7 in the inoperative position and according to FIGS. 8, 9 in the operative position. The air guiding system 13 has a main air guiding element 14 which, viewed in the vehicle longitudinal direction, is divided in the center while forming two main air guiding element sections 15, 16. In the inoperative position of the air guiding system 13, the main air guiding element sections 15, 16 of the main air guiding element 14 are integrated flush with the surface in the shaping of the rear area 10 of the vehicle. The main air guiding element sections 15, 16 then adjoin or abut one another while forming a separating line 17.

The main air guiding element 14 is divided into the two main air guiding element sections 15, 16 such that, when the main air guiding element 14 is displaced from the inoperative position according to FIGS. 1, 3 into the operative position according to FIGS. 2, 4, 5, 6, the two main air guiding element sections 15, 16 can be moved transversely to the vehicle longitudinal direction. In this case, the traversing movement of the lateral main air guiding element sections 15, 16 of the main air guiding element 14 transversely to the vehicle longitudinal direction is coupled to the displacement of the main air guiding element 14 or the main air guiding element sections 15, 16 from the inoperative position into the operative position, specifically such that, simultaneously or isochronously with the traversing movement of the lateral main air guiding element sections 15, 16 transversely to the vehicle longitudinal direction, the latter can be swiveled out of the shaping of the rear area 10.

A comparison of FIGS. 1 and 2 shows directly that, during the displacement of the main air guiding element 14 or of the main air guiding element sections 15, 16 from the inoperative into the operative position, the transverse dimension of the air guiding system 13 is enlarged and displaced toward the rear.

During the traversing movement of the main air guiding element sections 15, 16 of the main air guiding element 14 transversely to the vehicle longitudinal direction, their spacing transversely to the vehicle longitudinal direction increases. Consequently, the separating line 17 between the two main air guiding element sections 15 and 16, which line has minimal dimensions in the inoperative position (see FIGS. 1, 3) of the main air guiding element 14, is enlarged. Thus, a gap 18 is formed between the two main air guiding element sections 15, 16 that can be closed by an auxiliary air guiding element 19.

In the embodiment of FIGS. 1 to 9, the auxiliary air guiding element 19 is an integral component of the main air guiding element section 15. In the inoperative of the main air guiding element 14, the auxiliary air guiding element 19 of the main air guiding element section 15 is pushed under the main air guiding element section 16 (see FIG. 7). Only when the main air guiding element sections 15, 16 are moved apart transversely to the vehicle longitudinal direction while enlarging the transverse dimension of the air guiding system 13, will the auxiliary air guiding element 19, in the embodiment of FIGS. 1 to 9, become visible with a vertical offset remaining between the auxiliary air guiding element 19 and the two main air guiding element sections 15, 16. The auxiliary air guiding element 19 therefore does not close off the gap 18 flush with the surface in this embodiment.

Two mounting bases 20 connect the air guiding system 13 with the vehicle body part 12 of the rear area 10 of the vehicle or the air guiding system 13 is mounted by the mounting bases 20 on the vehicle body part 12. Instead of the two mounting bases 20, a continuous mounting plate can also be used. A mounting base 20 of this type or a common mounting plate is assigned to both main air guiding element sections 15, 16 of the main air guiding element 14. Each of the two main air guiding element sections 15, 16 is connected at a front end by way of two operating elements 21, 22 with the vehicle body part or with the mounting bases 20 or the mounting plate. In the following, the operating elements 21, 22 are called operating rods, but they can also be called operating guide rods.

Each of the operating rods 21, 22 of a main air guiding element section 15, 16 is articulatingly connected by a first section with the mounting base 20 and by a second section with the respective main air guiding element section 14 or 15.

Thus, particularly FIG. 8 illustrates that both operating rods 21, 22 are connected at ends by way of one joint 23, respectively, with the respective main air guiding element section 15, 16. These joints 23 are constructed as ball joints. The operating rods 22 are connected by a joint 24, particularly a pivot, at the opposite end with the respective mounting base 20. In contrast, the operating rods 21 are articulatingly connected at a central section by a joint 25, particularly a pivot, with the respective mounting base 20.

The operating rods 21 can be driven by a drive motor (not shown), specifically by a drive rod assembly designated generally by numeral 26. The drive rod assembly 26 has a central piece 27, with drive rods 28 being connected in an articulated manner to the central piece 27. The drive rods 28 are articulatingly connected with the operating rods 21, specifically at the still free ends. The drive motor (not shown) can rotate the central piece 27 and thereby rotate the operating rods 21 by way of the drive rods 28, whereby finally the two main air guiding element sections 15, 16 of the main air guiding element 14 are moved relative to one another transversely to the motor vehicle longitudinal direction. As an alternative, the drive rod assembly 26 can also be connected to the operating rods 22.

In addition to the operating elements or the operating rods 21, 22, one coupling element 29 respectively is also applied to the main air guiding element sections 15 and 16. In the following, the coupling element 29 will be called a coupling rod but can also be called a coupling guide rod.

Each of the coupling rods 29 is connected by a joint 30 with the respective main air guiding element section 15, 16 respectively. The coupling rods 29 are applied by another joint 31 to the vehicle body part 12, specifically to the mounting base 20 of the vehicle body part 12. The joints 30, 31 preferably are ball joints. The coupling rods 29 are applied to a rearward end of the main air guiding element sections 15, 16 and, when the main air guiding element sections 15, 16 are moved apart transversely to the longitudinal direction of the motor vehicle, cause an isochronous or simultaneous or superimposed swinging motion of the latter into a lifted position, so that they are moved in the upward direction out of the contour of the rear area 10.

Figure 6:
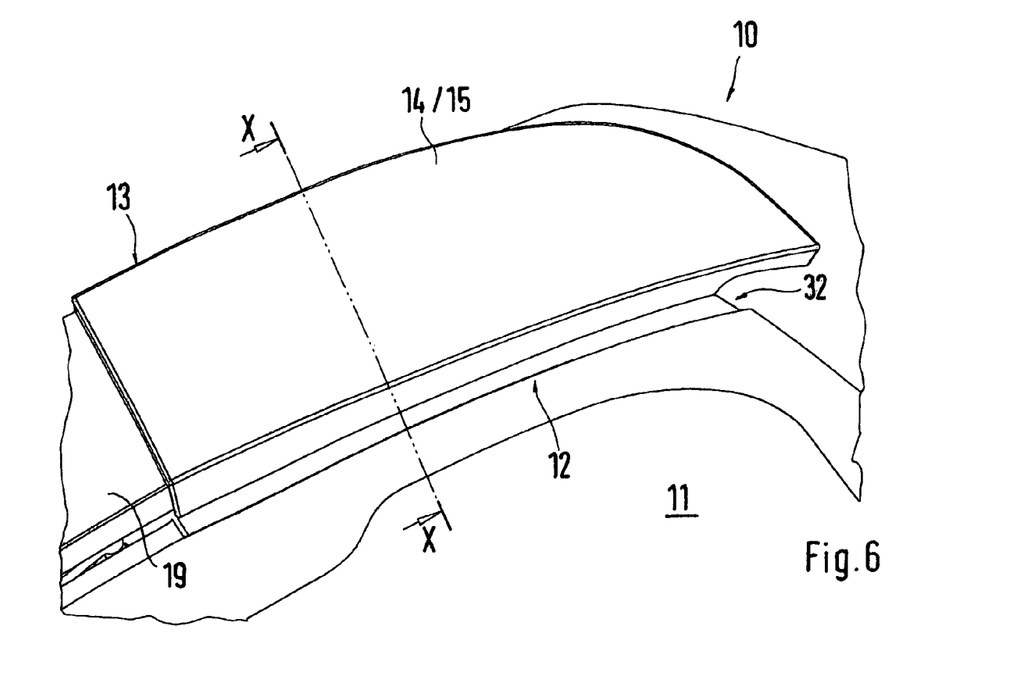
FIG. 6 is a perspective view diagonally from the front of a cutout of the rear area of FIGS. 1 to 5 with the air guiding system in the operative position.
Figure 10:
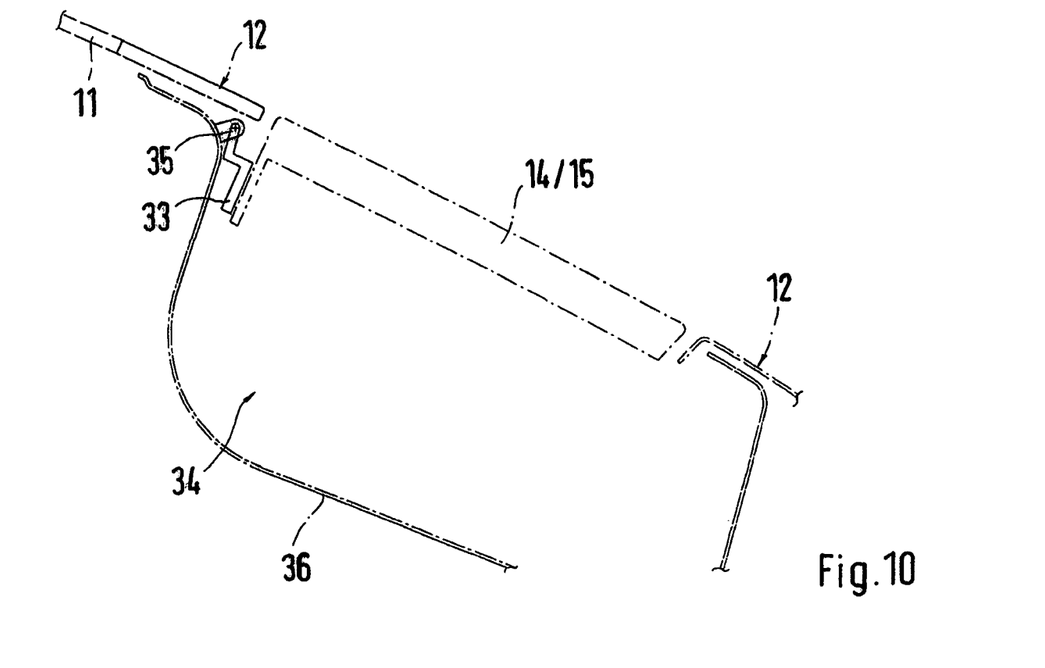
FIG. 10 is a schematic cross-sectional view along the section line X-X of FIG. 6 with the air guiding system in the inoperative position.
Figure 11:
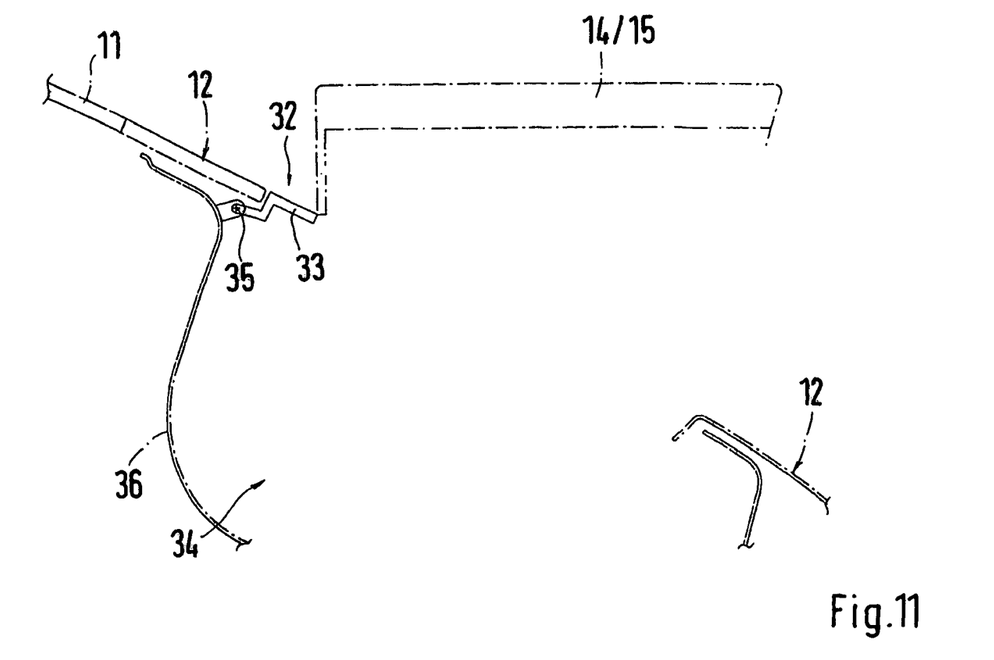
FIG. 11 is a cross-sectional view similar to FIG. 10 but with the air guiding system in the operative position.

When, as described above, the air guiding system 13 is moved or displaced from the inoperative position into the operative position, as best illustrated in FIG. 6, a gap 32 is formed between the vehicle body section 12 and a forward end of the main air guiding element 14 that has to be closed for aerodynamic reasons. For this purpose, one embodiment of a closing element 33 can be used which is illustrated in FIGS. 10, 11 and is constructed as a swivelable flap. When the air guiding system 13 or the main air guiding element 14 has moved into the operative position (FIG. 11), the closing element 33 is swiveled upward in order to close the gap 32. When, in contrast, the main air guiding element 14 has moved into the operative position (FIG. 10), the closing element 33 is folded into a receiving space 34 for the air guiding system 13. According to FIGS. 10 to 11, the flap-type closing element 33 is connected for this purpose by way of a joint 35 with a wall 36 bounding the receiving space 34.

Figure 12:
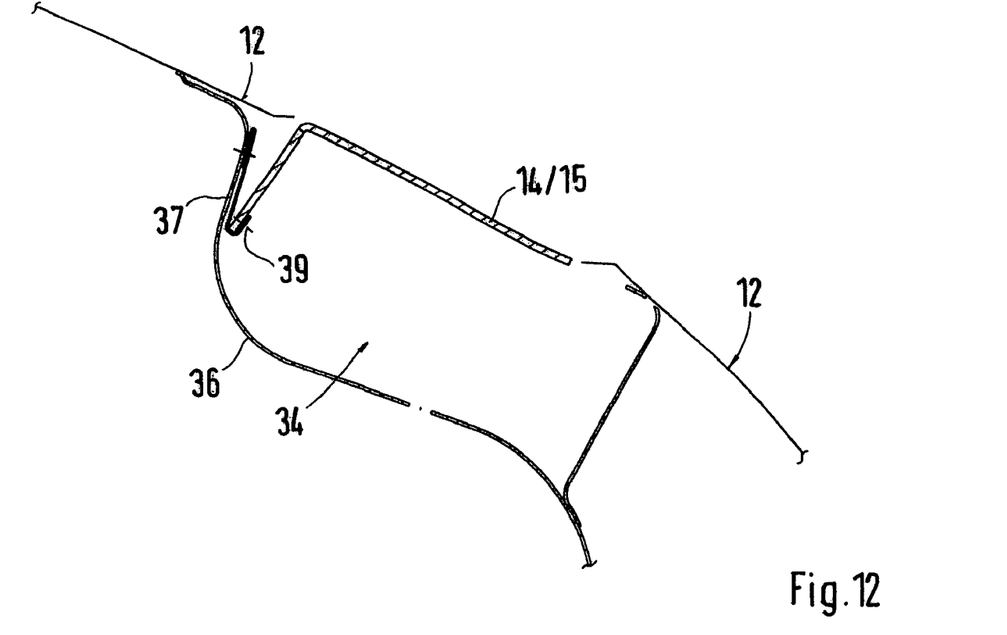
FIG. 12 is a schematic cross-sectional view along the line X-X of FIG. 6 with an alternative air guiding system embodiment in the inoperative position.
Figure 13:
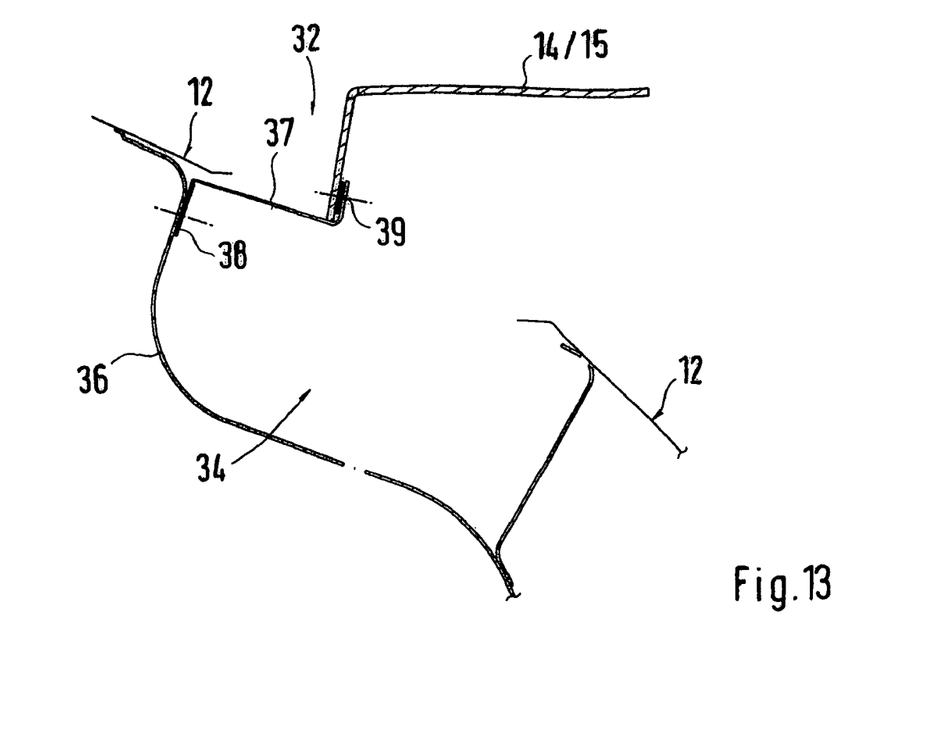
FIG. 13 is a cross-sectional view similar to FIG. 12, but with the air guiding system in the operative position.

An alternative embodiment of a closing element 37 for the gap 32 between the forward end of the air guiding system 13 and the vehicle body section 12 is illustrated in FIGS. 12 and 13. The closing element 37 is constructed as a flexible closing strip made of a textile material or of a rubber-like material. The flexible closing strip 37 is fixedly connected on a section 38 with the wall 36 bounding the receiving space 34. An opposite section 39 allows the closing element 37 to rest on the main air guiding element 14 in order to ensure a relative movement there between the closing element 37 and the main air guiding element 14, specifically its main air guiding element sections 15, 16.

Figure 14:
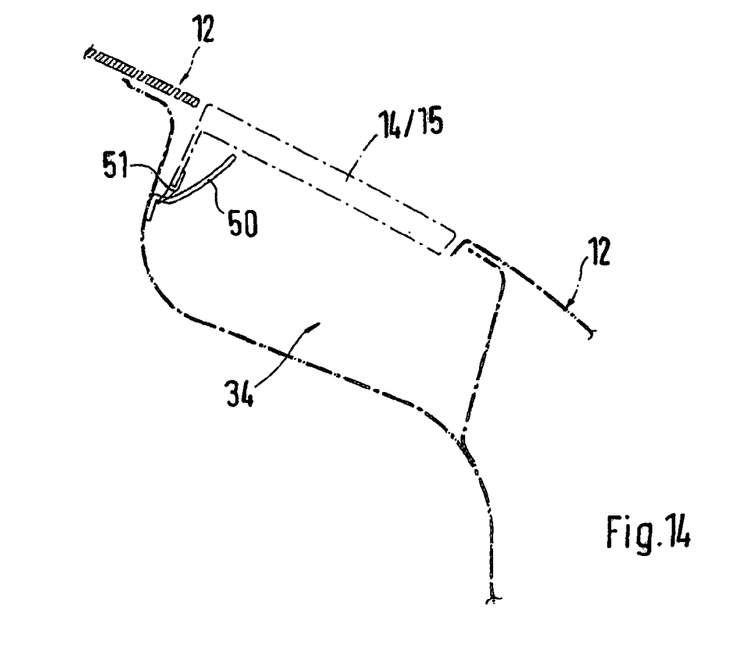
FIG. 14 is a schematic cross-sectional view along line X-X in FIG. 6 with a second alternative air guiding system embodiment in the inoperative position.
Figure 15:
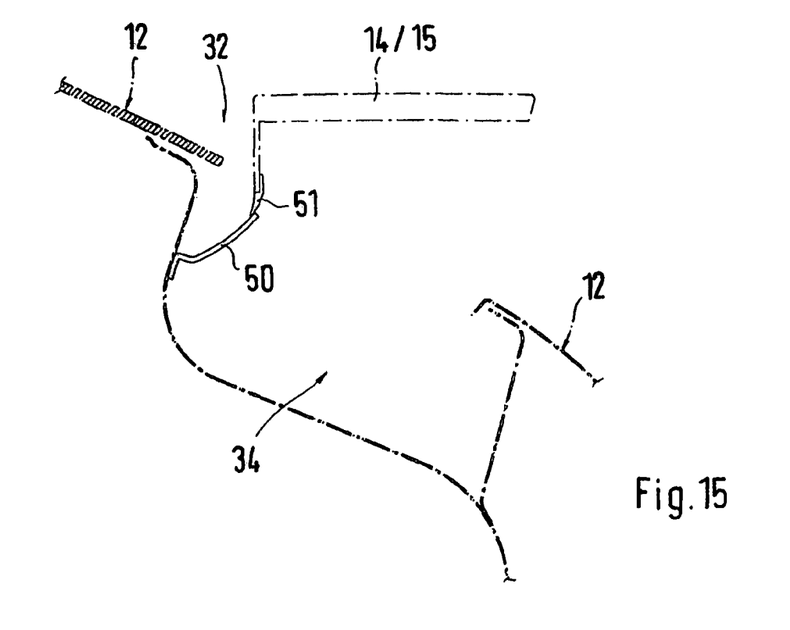
FIG. 15 is a cross-sectional view similar to FIG. 14, but with the air guiding system in the operative position.

Yet another embodiment of a closing element 50 for the gap 32 between the forward end of the air guiding system 13 and the vehicle body section 12 is shown in FIGS. 14, 15. The closing element 50 is constructed as an element fixed to the vehicle body, which interacts with a sealing lip 51 associated with the main air guiding element sections 15, 16. In any position of the main air guiding element sections 15, 16, the sealing lip rests against the body-fixed closing element 50 for sealing off the gap 32.

In contrast to the above, it is also contemplated to couple the main air guiding element sections 15 and 16 by way of a linear guide. In this contemplated embodiment of the invention, the operating elements 21, 22 (and possibly the coupling element 29) may then be eliminated on one of the main air guiding element sections 15, 16.

In a case in which simpler kinematics are permissible for adjusting the air guiding system, the coupling elements 29 may possibly be completely eliminated. Even the joints 23 constructed as ball joints in the area of the operating elements 21 and 22 may be replaced by pivots.

In the following, two additional embodiments of air guiding systems 40, 41 according to the invention are described with reference to FIGS. 16 to 18 and 19 to 21. These air guiding systems 40 and 41 respectively differ from the air guiding system 13 of the embodiment of FIGS. 1 to 9 only by the further development of the auxiliary air guiding element. For avoiding unnecessary repetitions here, the same reference numbers are used for identical assemblies, and only those details will be discussed in the following by which the embodiments of FIGS. 16 to 18 and 19 to 21 differ from the embodiment of FIGS. 1 to 9. In the illustrations of FIGS. 16 to 21, the mounting bases 20 as well as the drive rod assembly 26 are not shown for reasons of simplicity.

In addition to the two main air guiding element sections 15, 16, the air guiding system 40 of the embodiment of FIGS. 16 to 19 has an auxiliary air guiding element 42 constructed as a flap and which is on one side articulatingly connected with the main air guiding element section 15 of the main air guiding element 14 by a hinge 43. The hinge 43 defines a swiveling axis for the flap-type auxiliary air guiding element 42, with the swiveling axis extending in the motor vehicle longitudinal direction.

When the air guiding system 40 is changed from the inoperative position (FIG. 16) into the operative position (FIGS. 17 and 18) with the transverse displacement of the main air guiding element sections 15, 16 and with their isochronous or simultaneous swiveling into a lifted position, the flap-type auxiliary air guiding element 42 can be swiveled about this swiveling axis of the hinge 43 from a position below the main air guiding element sections 15, 16 into a position in which the auxiliary air guiding element 42 closes the gap 18 in a surface-flush manner, the gap 18 having been formed by the transverse displacement of the main air guiding element sections 15, 16.

Figure 16:
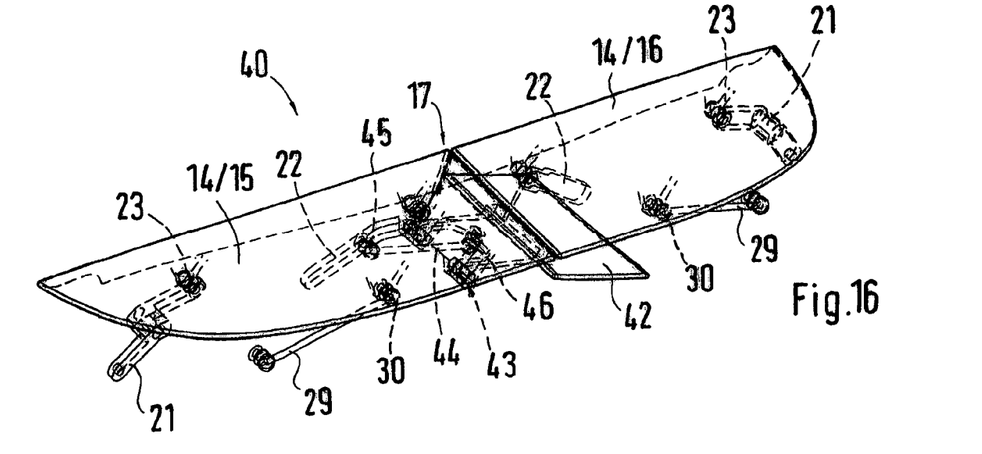
FIG. 16 is a perspective view of another air guiding system embodiment according to the invention in the inoperative position.
Figure 17:
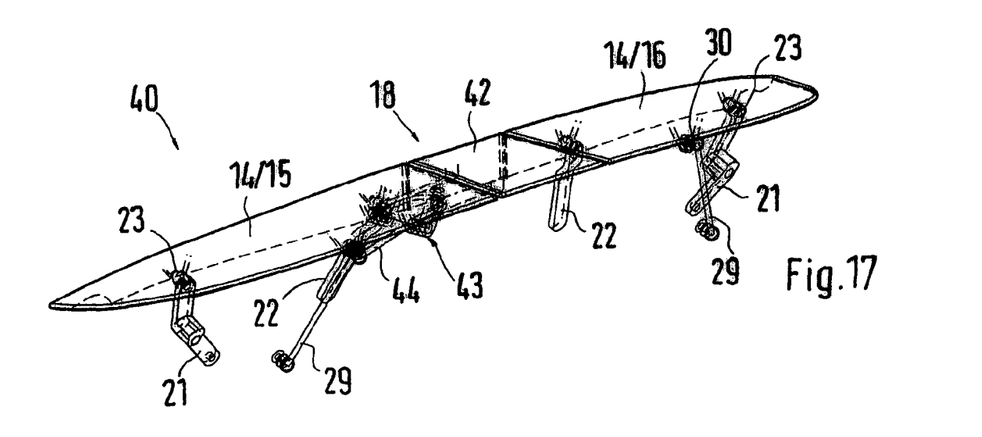
FIG. 17 is a perspective view of the air guiding system of FIG. 16, but in the operative position.
Figure 18:
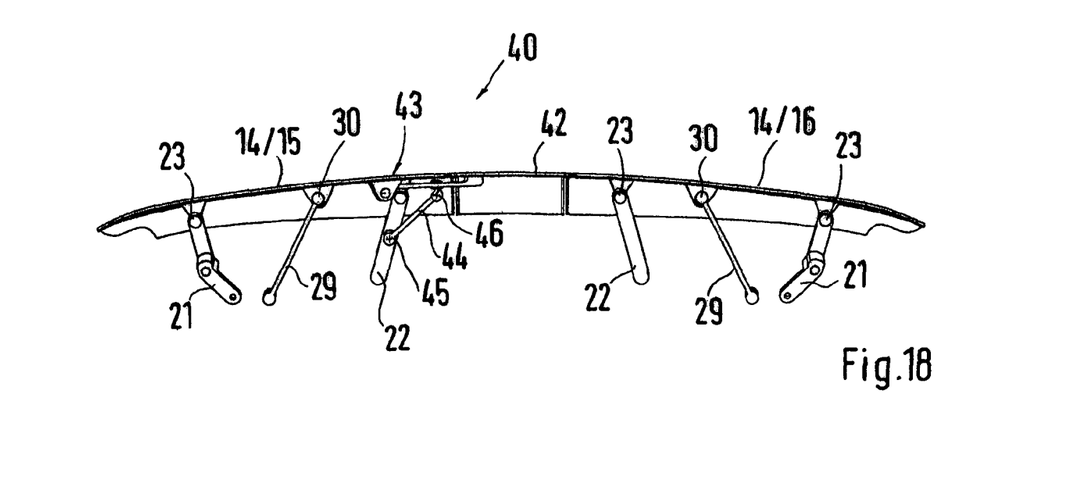
FIG. 18 is an elevational view of the air guiding system of FIGS. 16 and 17 also in the operative position.

By way of a coupling element 44 which, on one side, is applied to the operating rod 22 of the main air guiding element section 15 by way of a joint 45 and, on the other side, is applied to the hinge 43 of the auxiliary air guiding element 42 by way of a joint 46, the swiveling movement of the auxiliary air guiding element 42 during its change from the inoperative position into the operative position is coupled to the transverse displacement of the main air guiding element sections 15, 16 transversely to the longitudinal direction of the vehicle such that these movements take place isochronously or simultaneously. The coupling element 44 may also be called a coupling rod or a coupling guide rod.

Figure 19:
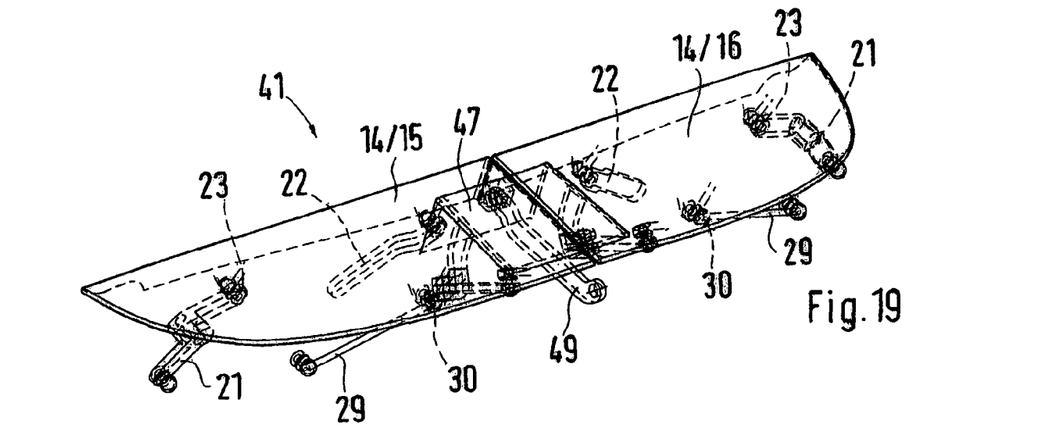
FIG. 19 is a perspective view of still another air guiding system embodiment according to the invention in the inoperative position.
Figure 20:
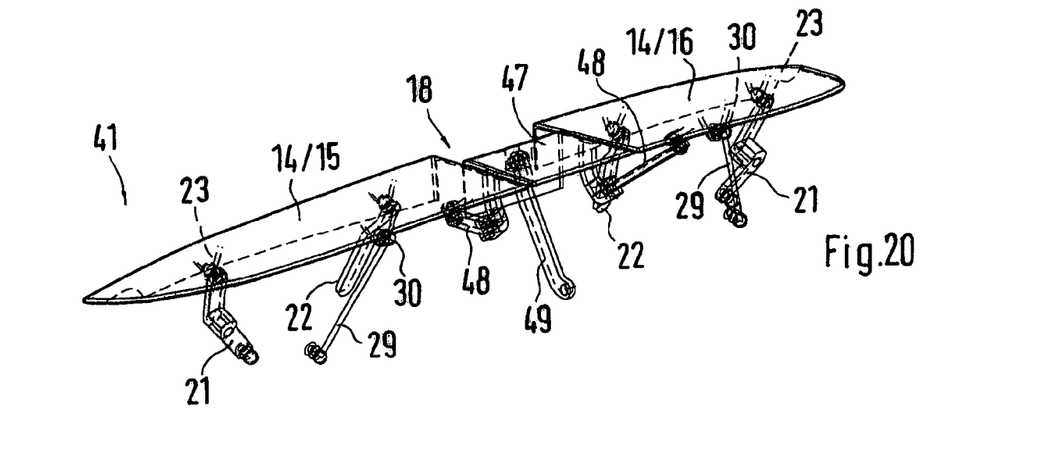
FIG. 20 is a perspective view of the air guiding system of FIG. 19, but in the operative position.
Figure 21:
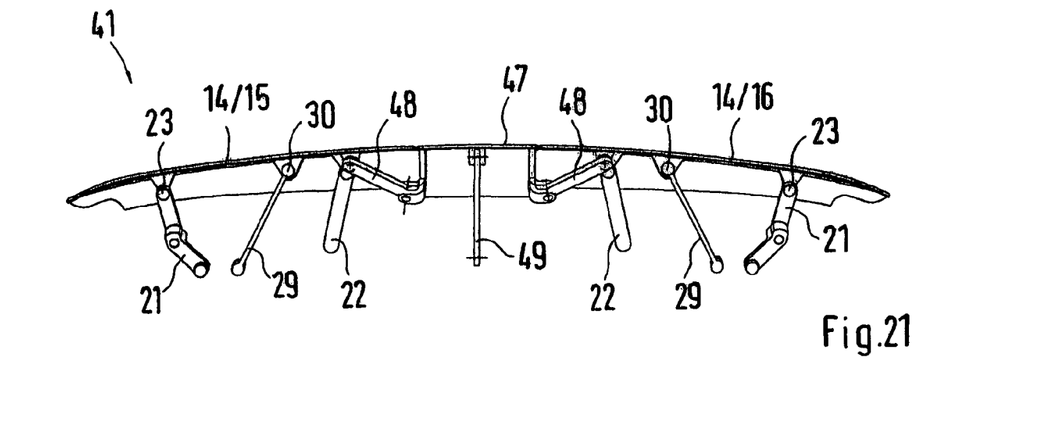
FIG. 21 is an elevational view of the air guiding system of FIGS. 19 and 20 also in the operative position.

In the embodiment of the air guiding system 41 of FIGS. 19 to 21, an auxiliary air guiding element 47 is linked on both sides by a coupling element 48 respectively to both main air guiding element sections 15, 16. During the change from the inoperative position (FIG. 19) into the operative position (FIGS. 20 and 21), the auxiliary air guiding element 47 is swiveled upward about a swiveling axis extending transversely to the vehicle longitudinal direction from a position below the main air guiding element sections 15, 16, so that the auxiliary air guiding element 47 closes off the gap 18 between the main air guiding element sections 15, 16 occurring during the transverse displacement of the main air guiding element sections 15, 16, in a surface-flush manner. The swiveling of the auxiliary air guiding element 47 takes place by way of another coupling element 49 which, on the side, is articulatingly connected with the auxiliary air guiding element 47 and, on the other side, is articulatingly connected with the vehicle body part 12. The coupling elements 48, 49 may also be called coupling rods or coupling guide bars.

The two-sided linking of the flap-type auxiliary air guiding element 47 to both main air guiding element sections 15, 16 according to FIGS. 19 to 21, in comparison to a one-sided linkage according to FIGS. 16 to 18, has the advantage that the auxiliary air guiding element is linked in a stiffer fashion and tolerances with respect to the main air guiding element sections are lower.

In the air guiding systems 13, 40 and 41 according to the present invention, a single drive is sufficient for changing all elements of the air guiding systems, specifically the main air guiding element sections 15, 16 of the main air guiding element 14 as well as the auxiliary air guiding element 19 and 42 and 47, respectively from the inoperative position into the operative position or from the operative position into the inoperative position. The drive torque provided by the drive motor is transmitted by the drive rod assembly 26 to the operating elements 21 that are articulatingly connected with the main air guiding element sections 15, 16 of the main air guiding element 14. As a result, the main air guiding element sections 15, 16 can be displaced transversely to the vehicle longitudinal direction, in which case, by way of coupling elements 29, that are also applied to the main air guiding element sections 15, 16, the latter are isochronously or simultaneously swiveled upwardly.

When the auxiliary air guiding element 42 and 47, respectively is constructed as a separate assembly (FIGS. 16 to 18 and 19 to 21, respectively), additional coupling elements are provided in order to also carry out the movement of the auxiliary air guiding element simultaneously or isochronously with the movement of the main air guiding element sections 15, 16 of the main air guiding element 14.

Although not shown in FIGS. 1 to 21, the main air guiding element 14 can also be divided into more than two main air guiding element sections, for example, three main air guiding element sections. The two outer main air guiding element sections, as described above, can then be changed from an inoperative position into an operative position or vice-versa, and a third central main air guiding element preferably has a stationary construction. Between the central main air guiding element and the two lateral displaceable main air guiding element sections, auxiliary air guiding elements will then be used for the closing of gaps which occur during the transverse displacement of the lateral main air guiding element sections between the latter and the central main air guiding element section, which auxiliary air guiding elements may be constructed as described in FIGS. 1 to 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Vehicle air guiding system arranged in a vehicle rear area comprising a main air guiding element arranged to be displaceable from a moved-in inoperative position to a moved-out operative position, wherein viewed in a vehicle longitudinal direction, the main air guiding element includes at least two main air guiding element sections and is divided so that, upon displacement of the main air guiding element from the inoperative position into the operative position, the at least two lateral main air guiding element sections are arranged to be displaceable transversely to the vehicle longitudinal direction.

2. The vehicle air guiding system according to claim 1, wherein the displacement of the at least two lateral main air guiding element sections transversely to the vehicle longitudinal direction is coupled to the displacement of the main air guiding element from the inoperative position into the operative position.

3. The vehicle air guiding system according to claim 1, wherein each of the at least two main air guiding element sections is connected by a respective coupling element with a vehicle body part or a vehicle-body-side mounting base, and a first end of each coupling element is articulatingly connected with the vehicle body part or the mounting base and a second end of each coupling element is articulatingly connected with the respective one of the at least two main air guiding element sections.

4. The vehicle air guiding system according to claim 3, wherein the second end of each coupling element is associated with the respective one of the at least two main air guiding element sections at a rearward end thereof.

5. The vehicle air guiding system according to claim 1, wherein a closing element is provided for closing a gap between the vehicle body part and a forward end of the main air guiding element produced by the displacement of the main air guiding element from the inoperative position into the operative position.

6. The vehicle air guiding system according to claim 5, wherein the closing element is one of a flap, a flexible closing strip, or an element fixed to the vehicle body.

7. The vehicle air guiding system according to claim 1, wherein during the displacement from the inoperative position, in which the main air guiding element is integrated in a contour of the vehicle rear area, the main air guiding element is arranged to be swivelable into the operative position out of the vehicle rear area contour, and simultaneously or isochronously thereto, the at least two lateral main air guiding element sections are arranged to be moveable transversely to the vehicle longitudinal direction while increasing a transverse dimension of the air guiding system.

8. The vehicle air guiding system according to claim 7, wherein the displacement of the at least two lateral main air guiding element sections transversely to the vehicle longitudinal direction is coupled to the displacement of the main air guiding element from the inoperative position into the operative position.

9. The vehicle air guiding system according to claim 7, wherein the main air guiding element is divided approximately in the center into the at least two main air guiding element sections.

10. The vehicle air guiding system according to claim 1, wherein an auxiliary air guiding element is provided to close a gap formed during the transverse displacement of adjacent main air guiding element sections.

11. The vehicle air guiding system according to claim 10, wherein the auxiliary air guiding element is integrated in an adjacent one of the at least two main air guiding element sections.

12. The vehicle air guiding system according to claim 10, wherein the auxiliary air guiding element has a flap-type construction and is articulatingly connected with an adjacent one of the at least two main air guiding element sections such that a swiveling movement of the flap-type auxiliary air guiding element about a swiveling axis extending in the vehicle longitudinal direction is coupled to the displacement of the main air guiding element sections transversely to the vehicle longitudinal direction and is thereby coupled to the displacement of the main air guiding element from the inoperative position into the operative position.

13. The vehicle air guiding system according to claim 10, wherein the auxiliary air guiding element comprises a flap and is articulatingly connected with adjacent ones of the at least two main air guiding element sections such that a swiveling movement of the auxiliary air guiding element about a swiveling axis extending transversely to the vehicle longitudinal direction is coupled to the displacement of the main air guiding element sections transversely to the vehicle longitudinal direction and thus to the displacement of the main air guiding element from the inoperative position into the operative position.

14. The vehicle air guiding system according to claim 1, wherein each of the at least two main air guiding element sections is connected by way of operating elements with a vehicle body part or a vehicle-body-side mounting base or a mounting plate, each of the operating elements being articulatingly connected by a first section with the vehicle body part or the mounting base or the mounting plate and being articulatingly connected by a second section with a respective one of the at least two main air guiding element sections.

15. The vehicle air guiding system according to claim 14, wherein one of the operating elements applied to the respective main air guiding section can be driven by a drive motor, and the driven operating element of each of the at least two main air guiding element sections is operatively connected by a drive rod assembly.

16. The vehicle air guiding system according to claim 14, wherein second sections of the operating elements are connected by ball joints with a respective one of the at least two main air guiding element sections to a forward end thereof.

17. The vehicle air guiding system according to claim 16, wherein one of the operating elements applied to the respective main air guiding section can be driven by a drive motor, and the driven operating element of each of the at least two main air guiding element sections is operatively connected by a drive rod assembly.

* * * * *